United States Patent
Doehring et al.

(10) Patent No.: US 11,376,810 B2
(45) Date of Patent: Jul. 5, 2022

(54) LAMINATE WITH SYNCHRONOUS STRUCTURE

(71) Applicant: Xylo Technologies AG, Niederteufen (CH)

(72) Inventors: Rainer Doehring, Mielec (PL); Dawid Piotrowski, Olkusz (PL)

(73) Assignee: Xylo Technologies AG, Niederteufen (CH)

( * ) Notice: Subject to any disclaimer, the term of this patent is extended or adjusted under 35 U.S.C. 154(b) by 0 days.

(21) Appl. No.: 16/958,223

(22) PCT Filed: Dec. 29, 2017

(86) PCT No.: PCT/EP2017/084805
§ 371 (c)(1),
(2) Date: Jun. 26, 2020

(87) PCT Pub. No.: WO2019/129356
PCT Pub. Date: Jul. 4, 2019

(65) Prior Publication Data
US 2020/0368993 A1   Nov. 26, 2020

(51) Int. Cl.
*E04C 3/00*  (2006.01)
*B32B 3/30*  (2006.01)
(Continued)

(52) U.S. Cl.
CPC .................. *B32B 3/30* (2013.01); *B32B 3/06* (2013.01); *B32B 21/02* (2013.01); *B32B 21/06* (2013.01);
(Continued)

(58) Field of Classification Search
CPC ..... B32B 3/30; B32B 37/1027; B32B 29/005; B32B 38/06; B32B 37/06; B32B 27/322;
(Continued)

(56) References Cited

U.S. PATENT DOCUMENTS 4,659,425 A  *  4/1987  Eggers ............... B32B 37/1027
                                                216/20
5,807,608 A  *  9/1998  O'Dell .................. B44C 5/0476
                                                427/195
(Continued)

FOREIGN PATENT DOCUMENTS

CA      2944698 A1    8/2015
CN    101821090 A     9/2010
(Continued)

OTHER PUBLICATIONS

Original and English Translation of Russian Decision on Granting a Patent for Invention issued for Russian Patent Application No. 2020120481/05(034905), dated Jul. 14, 2021.
(Continued)

*Primary Examiner* — Chi Q Nguyen
(74) *Attorney, Agent, or Firm* — Renner, Otto, Boisselle & Sklar, LLP

(57) ABSTRACT

A process for the manufacture of a laminate, in particular a continuously pressed laminate, CPL, which can be used, for example, as a surface laminate in the manufacture of worktops or floor panels. The process includes the provision of a finish foil and a support structure, as well as the pressing of the finish foil with the support structure in a CPL process. The provision of a support structure includes impregnating the support structure with phenolic resin. The finish foil is provided with a decorative pattern and a three-dimensional structure that is synchronized with the decorative pattern.

18 Claims, 2 Drawing Sheets

Figure 1:
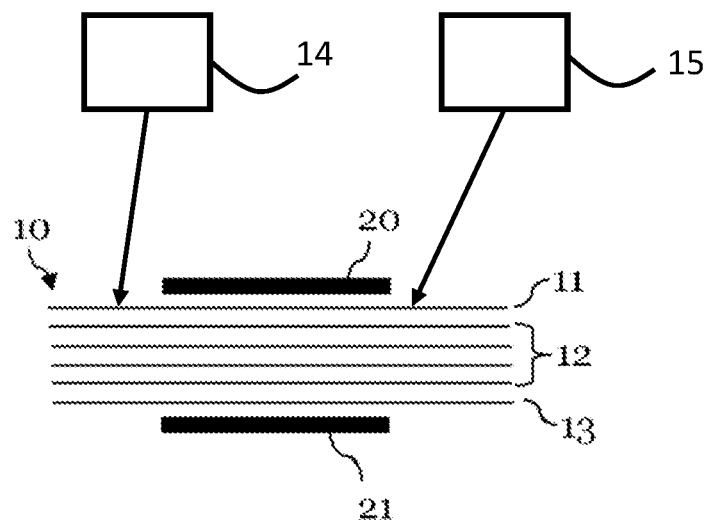

(51) Int. Cl.
| | |
|---|---|
| *B32B 3/06* | (2006.01) |
| *B32B 21/02* | (2006.01) |
| *B32B 21/06* | (2006.01) |
| *B32B 37/10* | (2006.01) |
| *B32B 38/06* | (2006.01) |
| *B44C 1/24* | (2006.01) |
| *B44C 5/04* | (2006.01) |
| *B44F 9/02* | (2006.01) |
| *E04F 13/08* | (2006.01) |
| *E04F 15/02* | (2006.01) |
| *E04F 15/10* | (2006.01) |

(52) U.S. Cl.
CPC .......... *B32B 37/1027* (2013.01); *B32B 38/06* (2013.01); *B44C 1/24* (2013.01); *B44C 5/0492* (2013.01); *B44F 9/02* (2013.01); *E04F 13/0866* (2013.01); *E04F 13/0889* (2013.01); *E04F 15/02005* (2013.01); *E04F 15/107* (2013.01); *B32B 2260/028* (2013.01); *B32B 2260/046* (2013.01); *B32B 2307/4023* (2013.01); *B32B 2307/558* (2013.01); *B32B 2471/00* (2013.01); *B32B 2479/00* (2013.01); *B32B 2607/00* (2013.01); *B44C 5/0461* (2013.01)

(58) Field of Classification Search
CPC ....... B32B 27/08; B32B 15/085; B32B 27/34; B32B 2307/714; B32B 2262/106; B32B 2307/3065; B29C 43/34; B29C 70/465; B29K 2995/009; B29K 2105/0872; B29K 2307/04; B29K 2027/12; B29K 2995/0016; B29K 2077/00; B29K 2995/0058; B29K 2081/04; E04F 15/107; E04F 15/02005; E04F 13/0889; E04F 13/0866; B44C 1/24; B44C 5/0492; B44C 5/0469; B44C 5/0461; B44F 9/02
USPC ... 52/592.1, 592.3, 592.2, 578, 309.1, 309.3
See application file for complete search history.

(56) References Cited

U.S. PATENT DOCUMENTS

| | | | | |
|---|---|---|---|---|
| 5,830,548 | A | * | 11/1998 | Andersen ................ B32B 27/20 428/36.4 |
| 2002/0160680 | A1 | | 10/2002 | Laurence et al. |
| 2012/0015176 | A1 | * | 1/2012 | Riebel ..................... B32B 27/06 428/323 |
| 2013/0273244 | A1 | * | 10/2013 | Vetter ....................... E04B 1/00 427/201 |
| 2015/0368528 | A1 | * | 12/2015 | Cho ..................... C08K 5/5435 257/40 |
| 2016/0369507 | A1 | * | 12/2016 | Pervan ................... B32B 13/06 |
| 2016/0375674 | A1 | * | 12/2016 | Schulte ................ E04F 15/045 156/220 |
| 2017/0113447 | A1 | * | 4/2017 | Martin ..................... B32B 7/10 |
| 2017/0291332 | A1 | * | 10/2017 | Braley ................... B32B 27/38 |
| 2018/0154614 | A1 | * | 6/2018 | Hosoda ................ B32B 27/286 |

FOREIGN PATENT DOCUMENTS

| | | |
|---|---|---|
| CN | 104169100 A | 11/2014 |
| RU | 2418684 C2 | 5/2011 |
| WO | 03/080337 A1 | 10/2003 |
| WO | 2009047304 A2 | 4/2009 |
| WO | 2011/003763 A2 | 1/2011 |
| WO | 2013139681 A1 | 9/2013 |
| WO | 2017/135810 A1 | 8/2017 |

OTHER PUBLICATIONS

International Search Report and Written Opinion for corresponding International Patent Application No. PCT/EP2017/084805 dated Aug. 24, 2018.
International Preliminary Report on Patentability for corresponding International Patent Application No. PCT/EP2017/084805 dated Feb. 25, 2020.
First Office Action dated Nov. 17, 2021, for corresponding Chinese Patent Application No. 201780097938.1.
Canadian Examiner's Report issued for corresponding Canadian Application No. 3,083,813, dated Sep. 27, 2021.

* cited by examiner

LAMINATE WITH SYNCHRONOUS STRUCTURE

1. FIELD OF THE INVENTION

The present invention relates to a method for the manufacture of a laminate, in particular a continuously pressed laminate, a method for the manufacture of a panel, as well as a correspondingly manufactured laminate and panel.

2. BACKGROUND OF THE INVENTION

State-of-the-art technology has produced a wide range of materials that can be used in the production of panels, such as wall, ceiling and flooring panels. For the production of such panels, a so-called finish foil can be applied to a carrier board made of e.g. MDF or HDF, for example in a coating process. The finish foil can ultimately form the surface of the resulting panel. A finish foil can be an impregnated and/or lacquered decorative paper. In the art, the carrier boards are typically MDF (medium density fibreboard) or HDF (high density fibreboard) boards.

Typically, such manufactured panels are not suitable for use as worktops, door or furniture panels, because the surface is not sufficiently wear resistant. This is particularly disadvantageous for use as a worktop, for example, which is exposed to a certain amount of material stress in daily use. A door or worktop made with such a panel thus exhibits high wear and tear on the surface when used as intended in everyday use, and is therefore worn out after a short period of time. As a result, the use of conventional finish foils for coating MDF or HDF boards is not suitable for normal and heavy-duty products such as worktops.

Furthermore, the surface of the conventional finish foils, and in particular their optical and/or haptic appearance, cannot be changed during the coating process for the production of the panel. As a result, the panel manufacturer is ultimately dependent on the manufacturing process of the supplier of the finish foils in this respect, and has no or only little influence on the appearance of the finished product or panel.

When applying the finish foils to a carrier board, such as an MDF or HDF board, a further negative effect becomes apparent, which is noticeable in the unevenness of the surface of the resulting product or panel. Usually, conventional finish foils are glued onto the carrier boards with the aid of glue dissolved in water. Due to the moisture content of the glue, a so-called "orange peel" is formed on the carrier board, which results from the partial swelling of the fibres or chips of the carrier board (e. g. MDF or HDF). In connection with the low layer thickness of conventional finish foils, which is usually less than 0.1 mm, this leads to a very uneven surface of the final product.

One object of the present invention is therefore to at least partially overcome the disadvantages mentioned above. One of the particular objects of this invention is to provide a process that enables the production of more resistant or wear-resistant laminates or panels, for example for use as worktops or floor panels. Furthermore, a possibility is provided to influence the appearance of the finished product, laminate or panel.

These and other objects which will be noticed when reading the following description, or which can be recognised by the skilled person, shall be solved in accordance with the subject matter of the independent claims, in particular by a process for the manufacture of a laminate as set out in claim 1, a laminate as set out in claim 17 or 19, a panel as set out in claim 22 and a process for the manufacture of a panel as set out in claim 26.

3. Detailed Description of the Invention

The present invention concerns a method for the production of a laminate, and in particular a continuously pressed laminate. Such a continuously pressed laminate is also known as CPL (continuous pressure laminate). This is a laminate produced in a continuous process from two or more layers. The laminate can be produced in the form of panels or as rolled goods, and can then be used, for example, to coat surfaces for the manufacture of a panel. In the following the terms "CPL", "continuously pressed laminate" and "CPL laminate" are used synonymously. The synonymous use of these terms does not imply any additional restriction of the individual terms with regard to the hardness or form of the material, for example.

The process involves the provision of a finish foil. The finish foil can also be denoted a top layer. The finish foil preferably has a thickness of 0.05 mm to 0.5 mm, further preferably between 0.06 mm and 0.3 mm, further preferably between 0.07 mm and 0.2 mm, further preferably between 0.08 mm and 0.15 mm, and most preferably between 0.09 mm and 0.1 mm. In particular, the thickness of the finish foil is preferably less than 0.1 mm. In one form of the invention, a conventional finish foil can be used.

The method further comprises providing a support structure, wherein the support structure is provided with a phenolic resin. The support structure can comprise or consist of several individual layers. The support structure can include one or more paper layers in particular. The paper layers can be available as cardboard layers. One or all of these layers preferably comprise the phenolic resin. The support structure preferably has a thickness from 0.1 mm to 2 mm, further preferably from 0.2 mm to 1.5 mm, further preferably from 0.3 mm to 1.2 mm, further preferably from 0.4 mm to 1.0 mm, and further preferably from 0.5 mm to 0.8 mm.

The process also includes pressing the provided finish foil with the support structure in a CPL process. In a CPL process, for example, the layers can be pressed in a continuous process into a kind of endless plate, by using e.g. a double-sided heated double-belt press. The double-belt press can comprise structural belts (i.e belts with a structured/ embossed surface). The pressing pressure can be lower than in the production of so-called HPL boards (High Pressure Laminate).

By combining a finish foil and the support structure with phenolic resin, it is advantageously possible to produce a material or laminate that is far superior to other materials in terms of its wear resistance. The resulting material or laminate thus allows, for example, the production of panels with a very wide range of applications. Compared to conventional finish foils, the resulting material or laminate is characterized by a higher layer thickness, which ultimately results in increased wear resistance. This means that the laminate can be used as a surface material for the manufacture of products, such as worktops, which therefore show only minor signs of wear and tear even under normal everyday use.

The resulting CPL laminate preferably has a thickness of 0.1 mm to 2 mm, further preferably from 0.2 mm to 1.5 mm, further preferably from 0.3 to 1.2 mm, further preferably from 0.4 mm to 1.0 mm, and further preferably from 0.5 mm to 0.8 mm. The resulting laminate is therefore characterised by a thickness that is preferably substantially larger than that of the finish foil. However, other thicknesses are also possible. Furthermore, the laminate can also be provided with an overlay film in certain designs, e. g. to increase the light-, moisture- or heat-resistance, whereby the finish foil is preferably arranged between such an overlay film and the support structure. The laminate is preferably sanded on one side.

The finish foil can be a commercial finish foil, which can have arbitrary structures. For example, it can have a super-matt surface finish. Preferably, the finish foil is provided with a decorative pattern and a three-dimensional structure. The finish foil is preferably printed with the decorative pattern and varnished in such a way that a synchronous structure corresponding to the print pattern is created. Preferably, the finish foil is then hardened by means of electron beam radiation. Thus, the surface of the finish foil can be provided with a (haptic) structure that is spatially related to the print pattern. Such a structure is also called synchronous pore in the art. Thus, the three-dimensional structure is preferably synchronized with the decorative pattern. In particular, the decorative pattern preferably imitates a wooden surface. The three-dimensional structure thereby also imitates a wood surface. The surface of the resulting laminate thus looks and feels like wood. On a printed knothole, for example, the generated (surface) structure would contain a round or oval haptic structure at the place of the printed knothole. The difference between the optical pattern and the haptic structure on the resulting laminate is preferably less than 3 mm, preferably less than 2 mm, preferably less than 1 mm, preferably less than 0.5 mm, preferably less than 0.2 mm, and preferably less than 0.1 mm. Most preferably, there is no deviation. As a result, a laminate can be produced where there is no displacement between the printed image and the embossing or structure. The surface structure of the finished laminate matches perfectly with the printed image or pattern, for example, for a real "wood impression" of the laminate.

Preferably, pressing is carried out against an embossing structure provided in the CPL process. Thus, for example, an embossing structure can be provided, which is pressed together with the finish foil and the support structure. The embossing structure can be provided in the CPL process by means of structural belts of the double-belt press. In particular, the embossing structure is preferably a textured press ribbon or structural belt, a textured paper, or a textured press plate. For example, the embossing structure may have been prepared by an etching process. The embossing structure can be provided with a predetermined degree of gloss. Thus, for example, the gloss level of the resulting laminate can be changed by 3 gloss levels. The degree of gloss and thus the appearance of the resulting surface can be significantly influenced by pressing the finish foil with the support structure against the embossing structure. The manufacturer of the laminate is therefore no longer completely dependent on the supplier of the finish foil, but can change its appearance during the production of the laminate. This also makes it possible to adjust the structure, pattern and gloss level of the laminate as synchronously as possible, so that there is no or only a slight deviation between structure, pattern and gloss level.

The phenolic resin is preferably a phenol-formaldehyde resin. The phenolic resin preferably comprises a curing agent, so that the phenolic resin has a turbidity time at 100° C. of 3.0 to 7.0 minutes, further preferably from 3.5 to 6.5 minutes, further preferably from 4.0 to 5.5 minutes, further preferably from 4.45 to 5.20 minutes and most preferably from 4.7 to 4.9 minutes. This allows the reactivity of the phenolic resin to be adjusted accordingly, to achieve optimum curing and resistance of the laminate.

The resin content in the support structure is preferably 70 to 99% by weight, further preferably 80 to 95% by weight, and most preferably 87 to 93% by weight. The weight is the overall weight of the support structure. Thereby, a wear-resistant laminate can be produced.

The provision of the support structure preferably involves impregnating the support structure with phenolic resin. The support structure is preferably impregnated with the phenolic resin. The volatile components of the impregnate are preferably between 6.5% and 9.0% after appropriate drying, and preferably between 7.0% and 8.5%, and most preferably between 7.5% and 8.0%. This enables optimal curing of the laminate.

Preferably, pressing is carried out in the CPL process at a pressure of 10 bar to 100 bar, further preferably from 15 bar to 80 bar, further preferably from 20 bar to 60 bar, further preferably from 25 bar to 45 bar and most preferably from 30 bar to 35 bar.

Preferably, pressing is carried out in the CPL process at a temperature of 120° C. to 200° C., further preferably from 140° C. to 180° C., further preferably 150° C. to 170° C., and most preferably at about 165° C.

Furthermore, the invention relates to a laminate which is manufactured according to one of the above-mentioned methods. The advantage of this laminate is that it has a greater layer thickness than standard commercial finish foils, which results in high wear resistance. Thus, the laminate preferably has a thickness of 0.1 mm to 2 mm, further preferably from 0.2 mm to 1.5 mm, further preferably from 0.3 to 1.2 mm, further preferably from 0.4 mm to 1.0 mm, and further preferably from 0.5 mm to 0.8 mm. Furthermore, the colour or pattern, structure and/or gloss level of the laminate should preferably be synchronized as described above.

Furthermore, the invention relates to a laminate, and in particular a continuously pressed laminate. This laminate has a finish foil and a support structure, whereby the support structure is provided with a phenolic resin. The finish foil is pressed with the support structure. This laminate also has thicknesses as described above and offers a high wear resistance.

Furthermore, the invention relates to a panel, and in particular a wall, ceiling or floor panel. The panel can also be designed as a door or furniture panel and can be used, for example, as a vertical surface in furniture. The panel can also be designed as a worktop. The panel has a carrier board and a laminate in accordance with the above embodiments. For example, a HDF, MDF or chipboard board can be used as a carrier board. The resulting panel has a high surface resistance and thus a long service life. In particular, the use of the laminate described above results in a flat and even surface of the panel, especially in comparison with panels where conventional finish foils are pressed directly onto the carrier board. The "orange peel" effect is avoided.

The panel is preferably designed as a floor panel. The panel preferably has coupling elements, which are designed for positive coupling with at least one further panel (of similar or identical design), whereby the coupling takes place without glue. Due to the improved surface properties, it is therefore advantageously possible to produce an even and wear-resistant floor covering.

Furthermore, the invention concerns a method for the production of a panel, in particular a panel as described above. The method comprises the provision of a laminate as described above, and the provision of a carrier board which is in particular a HDF, MDF or chipboard board. The process also includes applying, and in particular laminating, the laminate to the carrier board.

Furthermore, the present invention concerns the use of a laminate described above as a surface for the manufacture of worktops or vertical surfaces such as furniture fronts or doors. Due to its high wear resistance, this laminate can be used, for example, on worktops in contrast to commercial finish foils, which are unsuitable for such an application. Production in a CPL process also results in a very smooth and even surface of the final material.

The increased wear resistance of one of the laminates or panels described above or a laminate or panel manufactured according to the processes described above can be characterised in accordance with EN 438. In this case, the laminate preferably exhibits ball impact values with small balls of at least 5 N, further preferably of at least 7 N, further preferably of at least 8 N, and further preferably of at least 9 N. Similarly, the laminate can preferably exhibit ball impact values with a shock load with small balls of at most 15 N, further preferably of at most 12 N. In addition, the laminate can exhibit ball impact values with small balls of at most 15 N, further preferably of at most 12 N. The panel shall preferably have ball impact values for a shock load with small balls of at least 15 N, further preferably at least 17 N, further preferably at least 19 N, further preferably at least 21 N, and further preferably at least 22 N. Likewise, the laminate can preferably exhibit ball impact values with a maximum impact load of 30 N for small balls, and preferably a maximum of 25 N.

4. DESCRIPTION OF PREFERRED EMBODIMENTS

In the following, the present invention is described in more detail with reference to the enclosed figures. Same elements have the same reference numbers.

Figure 2:
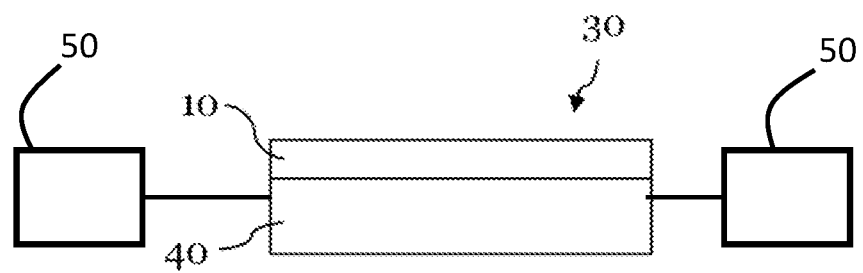
Figure 3:
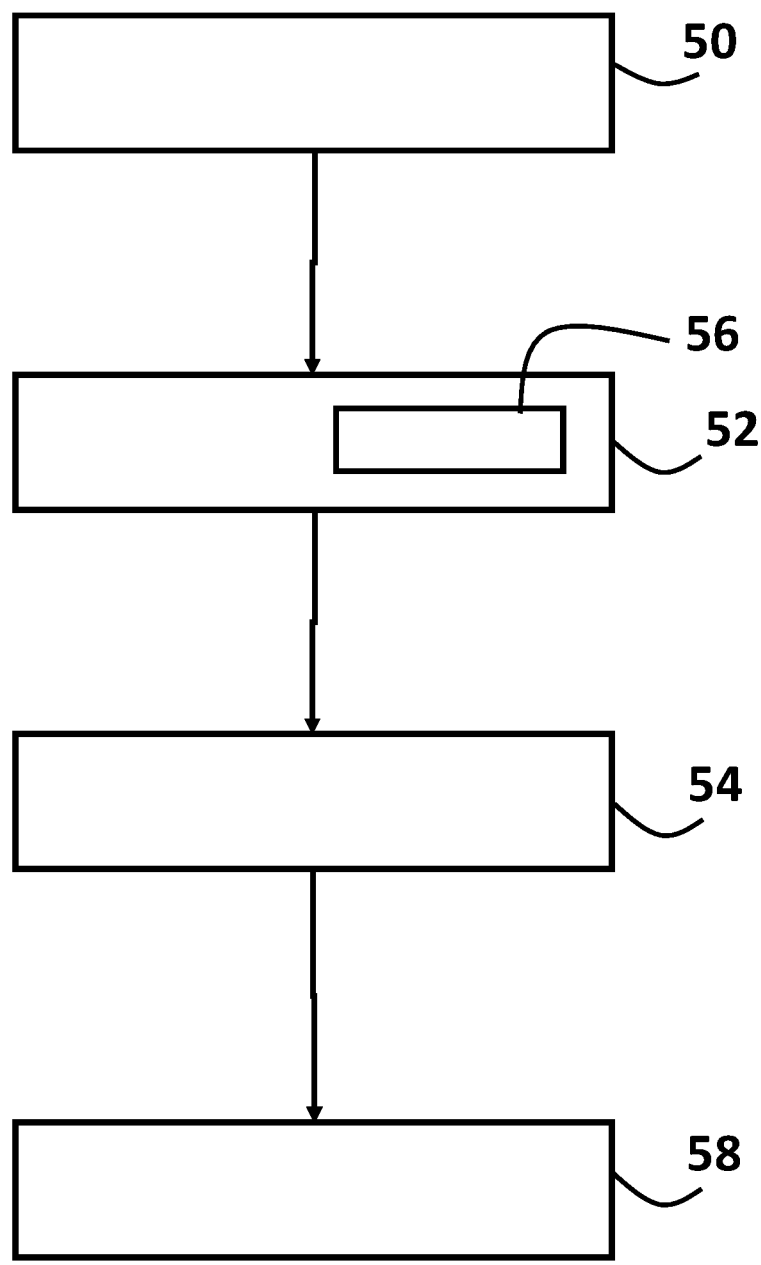

FIG. 1 schematically illustrates the method for the manufacture of a continuously pressed laminate according to an embodiment of the invention;

FIG. 2 schematically shows the composition of a panel according to another embodiment of the invention; and FIG. 3 schematically illustrates the method steps used for the manufacture of a continuously pressed laminate according to an embodiment of the invention.

FIG. 1 shows a process for the production of a continuously pressed laminate 10 in accordance with an embodiment of the present invention. A double-belt press with two structural belts 20, 21 arranged opposite each other is provided. These structural belts 20, 21 guide the individual layers in the CPL process in order to ultimately form the CPL laminate or laminate 10. Structural belts 20, 21 can include a structured belt (made of etched and chrome-plated steel) or a texturing paper (painted and embossed paper) or similar.

The materials or layers that are fed to the structural belts 20,21 comprise a finish foil 11, a support structure 12, and in the shown embodiment also a dry sheet 13 made of sodium kraft paper. The support structure 12 is arranged between the finish foil 11 and the dry sheet 13.

In the embodiment shown in FIG. 1, the support structure 12 comprises four layers of individual layers of paper. However, the skilled person understands that in other embodiments more or less paper layers or other materials can be used to form the support structure 12. The paper layers of support structure 12 comprise phenolic resin. For this purpose, the individual paper layers were impregnated accordingly. The decisive factor is the reactivity of the phenolic resin, which is set for impregnation within a tolerance range of preferably 4.45 to 5.20 minutes (clouding time measured at 100° C.) per hardener. Furthermore, the resin content in the impregnation is set between 87% and 93% (based on the paper mass). The volatile components after drying of the impregnate are kept within a tolerance of 7.5% to 8.0%.

Finish foil 11 has a printed image (decorative pattern 14) that imitates a wooden surface. Furthermore, the finish foil 11 has a (haptic) structure (three-dimensional structure 15) which is synchronous to the printed image. This structure thus matches the printed image, so that in the finished laminate 10 the haptic impression matches the optical impression. In another version, the finish foil 11 can also have a different surface finish, such as a super-matt surface finish.

Finish foil 11, support structure 12 and dry sheet 13 are pressed in a CPL process using structural belts 20, 21. This is done at a pressure of 35 to 50 bar and a temperature of 165° C.

In a particular embodiment of the present invention, at least one of the structural belts 20, 21 is provided with a textured surface. This textured surface gives the surface of the resulting laminate a corresponding surface finish, whereby the gloss level of the finished laminate can be adjusted or changed. In another embodiment, the finish foil 11 can also be pressed against a structural band or a texturing paper in the CPL process to influence the gloss level and thus the appearance of the resulting surface. Thus it is advantageous to obtain a synchronization of the print image, structure/pores and the gloss level of the finished laminate. Summer rings in the print image can show a higher degree of gloss than rougher winter rings in the print image.

FIG. 2 shows a panel 30 in accordance with another embodiment of the present invention. This panel consists of a carrier board 40 made of MDF or HDF. A CPL laminate or laminate 10 is applied or laminated onto this carrier board 40. This laminate 10 is preferably a laminate produced by means of a manufacturing method as described above with reference to FIG. 1. Instead of a standard commercial finish foil, laminate 10 is thus applied to the carrier board 40. Due to the higher wear resistance of laminate 10, the surface of the finished panel 30 is also more resistant. This means that the panel 30 can be used advantageously not only as a floor, ceiling or wall panel, but also as a worktop or as a vertical surface, such as in furniture fronts or doors. Furthermore, the surface of the panel 30 has a uniform and smooth structure, which results from the manufacturing process and also from the increased layer thickness of laminate 10 compared to conventional finish foils 11.

Such a laminate 10 produced in accordance with the present invention preferably has a ball impact strength of 9 N under impact stress with small balls, while a correspondingly manufactured panel has a value of 22 N.

In preferred embodiments, the panel 30 can be used as a floor panel. For this purpose, as shown in FIG. 2 panel 30 comprises appropriate coupling elements 48 on its sides, which allow a positive coupling of such panels 30 with other panels, without the use of glue. Due to the advantageous surface quality of the panels 30, these panels are very well suited for interconnection.

Referring to FIGS. 1 to 3, a method for producing a laminate 10, in particular a continuously pressed laminate, CPL, comprising the following steps: 50 providing a finish foil n; 52 providing a support structure 12, wherein the support structure 12 is provided with a phenolic resin; and 54 pressing of the finish foil 11 with the support structure 12 in a CPL process. The finish foil 11 is provided with a decorative pattern 14 and a three-dimensional structure 15. The structure 15 is synchronized with the decorative pattern 14, and the pattern may imitate a wooden surface.

The pressing step 54 is carried out against an embossing structure provided in the CPL process. The embossing structure may be a textured press belt, or a textured paper, or a textured press plate, for example.

The phenolic resin is a phenol-formaldehyde resin. And the phenolic resin includes a curing agent such that the phenolic resin has a turbidity time at 100 degrees Celsius of 3.0 to 7.0 minutes, preferably of 3.5 to 6.5 minutes, more preferably of 4.0 to 5.5 minutes, even more preferably of 4.45 to 5.20 minutes, and most preferably of 4.7 to 4.9 minutes. The resin content in the support structure 12 is 70 to 99% by weight, preferably 80 to 95% by weight, and most preferably 87 to 93% by weight.

The support structure 12 comprises one or more layers of paper. The step 52 of providing the support structure 12 further includes the step of 56 impregnating the support structure 12 with phenolic resin.

Volatile matter in the laminate 10 after drying of the impregnate are in the range between 6.5% and 9.0%, preferably between 7.0% and 8.5%, and most preferably between 7.5% and 8.0%.

The pressing step 54 takes place at a pressure of 10 to 100 bar, preferably from 15 to 80 bar, further preferably from 20 to 60 bar, further preferably from 25 to 45 bar and most preferably from 30 to 35 bar. The pressing step 54 is carried out at a temperature of 120 to 200 degrees Celsius, preferably 140 to 180 degrees Celsius, further preferably 150 to 170 degrees Celsius, and most preferably about 165 degrees Celsius. The pressing step 54 is preferably carried out by means of a double-belt press, preferably comprising two structural belts 20, 21.

The method may further include the step of 58 providing a dry sheet 13, wherein the pressing step 54 comprises compressing the finish foil 11 with the support structure 12 and the dry sheet 13 in the CPL process.

REFERENCE NUMBERS

10 Laminate
11 Finish foil
12 Support structure
13 Dry sheet
20,21 Structural belts
30 Panel
40 Carrier board
48 Coupling elements
50 Step of providing a finish foil
52 Step of providing a support structure
54 Step of pressing
56 Step of impregnating the support structure with phenolic resin
58 Step of providing a dry sheet

The invention claimed is:

1. A method for producing a laminate, comprising the following steps:
    providing a finish foil, wherein the finish foil is provided with a decorative pattern and a three-dimensional structure, where the three-dimensional structure is synchronized with the decorative pattern;
    providing a support structure, wherein the support structure is provided with a phenolic resin; and
    pressing of the finish foil with the support structure in a CPL-continuously pressed laminate (CPL) process,
    wherein the phenolic resin is a phenol-formaldehyde resin;
    wherein the phenolic resin includes a curing agent such that the phenolic resin has a turbidity time at 100 degrees Celsius of 3.0 to 7.0 minutes;
    wherein the resin content in the support structure is 70 to 99% by weight;
    wherein providing the support structure includes impregnating the support structure with the phenolic resin;
    wherein volatile matter after drying of the impregnate are in a range between 6.5% and 9.0%.

2. The method according to claim 1, wherein the pattern imitates a wooden surface.

3. The method according to claim 1, wherein the pressing is carried out against an embossing structure provided in the CPL process.

4. The method according to claim 3, wherein the embossing structure is a textured press belt, or a textured paper, or a textured press plate.

5. The method according to claim 1, wherein the phenolic resin comprises a curing agent such that the phenolic resin has a turbidity time at 100 degrees Celsius of 3.5 to 6.5 minutes.

6. The method according to claim 1, wherein the resin content in the support structure is 80 to 95% by weight.

7. The method according to claim 1, wherein the support structure comprises one or more layers of paper.

8. The method according to claim 1, wherein the pressing takes place at a pressure of 10 to 100 bar.

9. The method according to claim 1, wherein the pressing is carried out at a temperature of 120 to 200 degrees Celsius.

10. The method according to claim 1, wherein the pressing is carried out by a double-belt press.

11. The method according to claim 1, further comprising providing a dry sheet, wherein the pressing comprises compressing the finish foil with the support structure and the dry sheet in the CPL process.

12. Laminate manufactured by a method according to claim 1.

13. The laminate according to claim 12, wherein the laminate has ball impact values according to EN 438 at a shock load with small balls of at least 5 N and not more than 15 N.

14. A panel, comprising a carrier board and a laminate in accordance with claim 12 attached to the carrier board.

15. The panel according to claim 14, the panel being designed as a floor panel, comprising coupling elements adapted for positive coupling without glue to another similar panel.

16. The panel according to claim 14, wherein the panel has ball impact values according to EN 438 at a shock load with small balls of at least 15 N and a maximum of 30 N.

17. A process for the manufacture of a panel:
    providing a laminate according to claim 12;
    providing a carrier board; and
    laminating the laminate onto the carrier board.

18. A laminate, comprising:
    a finish foil; and
    a support structure, wherein the support structure is provided with a phenolic resin;
    wherein the finish foil is provided with a decorative pattern and a three-dimensional structure, where the three-dimensional structure is synchronized with the decorative pattern, wherein the finish foil is pressed with the support structure to form the laminate, and
the laminate having a thickness of from 0.1 to 2.0 mm.

\* \* \* \* \*